Jan. 21, 1964  R. W. ASTHEIMER ETAL  3,119,018
HORIZON SENSOR SYSTEM

Filed Jan. 2, 1962  2 Sheets-Sheet 1

INVENTORS
ROBERT W. ASTHEIMER
THOMAS F. MCHENRY
BY
ATTORNEY

INVENTORS
ROBERT W. ASTHEIMER
THOMAS F. MCHENRY
BY
*Robert Elmer Norto*
ATTORNEY

United States Patent Office 3,119,018
Patented Jan. 21, 1964

3,119,018
HORIZON SENSOR SYSTEM
Robert W. Astheimer, Westport, and Thomas F. McHenry, East Norwalk, Conn., assignors to Barnes Engineering Company, Stamford, Conn., a corporation of Delaware
Filed Jan. 2, 1962, Ser. No. 163,838
6 Claims. (Cl. 250—83.3)

This invention relates to an improved horizon sensor system for the control of vehicles in the air or space such as satellites, missiles, manned capsules and the like. More particularly the invention deals with a combination of horizon sensors and a type of electronic circuit.

Horizon sensors have been of great importance in space navigation. A vehicle must be maintained in a definite attitude or orientation otherwise the instrumental information from it may be improper or in the case of living passengers lack of steadiness can be fatal.

The first form of horizon sensor and one which has achieved large scale use involved a conical scan. This horizon sensor is described in an article by Arck in the September 1961 issue of Automatic Control. An even fuller description is to be found in the patent to Merlen 3,020,407, February 6, 1962. The sensor employed a rotating germanium prism which produced a conical scan with a cone angle of about 110°. Normally two sensors are used, one aimed in the direction of travel and the other at right angles thereto. The first horizon sensor scans across space and the earth and by determining the relative scan times from a reference marker oriented on the vehicle to each horizon detects any roll. Similarly the other sensor which is aimed out of the side of the vehicle gives information on the pitch of the vehicle. The radiation detector in each sensor produces an electrical output which is processed in suitable circuits and finally gives an output signal which is proportional to error. This signal is used to actuate correcting devices restoring the vehicle to its predetermined attitude. It is common also to provide for disabling the output from a sensor if it accidentally scans across the sun and so receives an excessive signal or the vehicle tilts to the point where the scan no longer strikes the earth which is essentially a zero output.

The above described sensor is not the only type which has been developed for conical scan as catoptric scanners are perfectly possible, they have higher optical efficiency particularly in long wave infrared and are easily constructed except where certain extreme space requirements make the usual design unavailable. There will be illustrated a catoptric scanner which, although introducing greater complexity, can be used in certain situations.

Scanners in which there is an oscillating scan across the horizon have also been successively built and for certain purposes they have advantages. Since the present invention in its broader aspects is not particularly concerned with the type of horizon sensor scanning it will be described in terms of the well known conical scan sensors it being understood that they are merely illustrative of one well known type of scanner.

Horizon sensing of space vehicles presents a number of serious problems, one of the most important of which is reliability because the vehicles operate in a very unfriendly environment and may have to operate for years unattended. Also, the stresses encountered in launching a space vehicle are quite severe. As a result one of the goals of horizon sensor design has been the absolute maximum in reliability. The sensors are designed to extraordinary high standards and utilize components of extreme reliability and resistance to unfavorable environmental situations. Nevertheless no component has an indefinite life.

One of the ways in which reliability can be increased is to multiply the number of components in such a way that if one fails the others will continue to function. This is ordinarily referred to as redundancy. The principle is applicable to horizon sensors just as it is to any precise instrument. Another factor is the difficulty of reconciling concurrent outputs of a number of horizon sensors operating simultaneously. It is not an insoluble problem but requires sophisticated electronics with greatly increased possibilities of failure. As a result it is not normal practice to provide redundant horizon sensors and the art has developed primarily along the single line of making a horizon sensor inherently more reliable. The limits of what can be done in this line with present day technology are being approached and so the problem of reliability is still a very serious one.

The present invention permits the operation of pairs of horizon sensors simultaneously with the addition of only two electronic components which can be of a type having extremely low failure rates. At the same time, and without the addition of any elements, the paired horizon sensors are capable of performing an additional advantageous function namely the elimination of interference with the sun. This additional advantage is obtained without any compromise whatsoever in the increased reliability obtained by redundancy.

It is possible to group more than two horizon sensors to obtain still greater reliability and such systems are included in the present invention. However, paired horizon sensors illustrate the advantages obtainable very clearly and so for simplicity's sake the present specification will describe paired systems it being understood that the invention is not limited to connecting only two horizon sensors in parallel.

It has been stated above that the present invention is not limited to any particular horizon sensor. This is not to say that there are not certain modifications of type which are particularly suitable. In general if conical scans are used the advantages of the present invention are obtained better with somewhat larger cone angles then has hitherto been the practice. Instead of cone angles of around 110° it is sometimes advantageous to utilize larger angles, for example, 160°. The advantages of the present invention are obtainable in each case.

The processing circuits which are actuated by the error signals of horizon sensors are standard and are not in any way changed by the present invention. Therefore, it may be considered that the present invention ceases when an error signal that will be operative even in the case of failure of a horizon sensor is produced. The particular type of systems for correcting vehicle attitude using the error signals, therefore, form no part of the present invention except that their input should have a sufficiently high impedance. It is an advantage that no change in the systems is made necessary by the present invention. Its advantages are obtained without requiring any additional elements.

The invention will be described in more detail in conjunction with the drawings in which.

Figure 1:
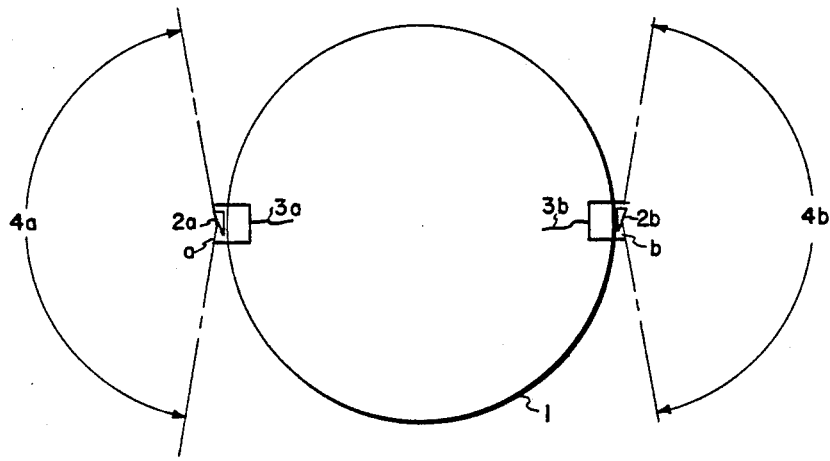
FIG. 1 is a section through a vehicle body showing two conventional horizon sensors on opposite sides of the vehicle body.

In FIG. 1 the body of the space vehicle is shown at 1 with two horizon sensors shown diagrammatically at *a* and *b*. Each sensor, which is of the type described in the article above referred to, is provided with a rotating scanning prism 2a and 2b respectively. Electronic outputs come from the output wires 3a and 3b and the scanning cone with an angle of about 160 to 175° is shown diagrammatically at 4a and 4b. The pair of horizon sensors are pitch sensors and a similar pair in the ends of the vehicle will provide roll sensing, one such sensor being shown in FIG. 4 of the article above referred to. As the present invention operates equally with roll and pitch sensors it will be described in connection with the pitch sensors of FIG. 1.

Figure 2:
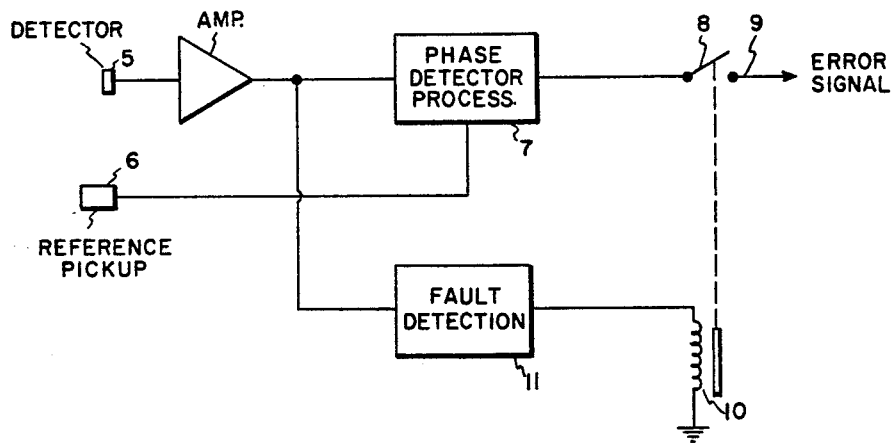
FIG. 2 is a block diagram of the electronic circuits of one horizon sensor.

FIG. 2 shows a simplified schematic of a single sensor showing a detector 5 and a conventional reference signal pickup 6. In the type of horizon sensor referred to in the above article the reference source is a magnetic pickup as shown in FIG. 1 of the Merlen patent above referred to and produces a pulse at a predetermined point of rotation with respect to vehicle attitude. When the vehicle is in its predetermined attitude this reference pulse is equidistant from the pulses resulting from the two horizon crossings. The amplifier output and the reference pulse is introduced into phase detector processing circuits 7 and produces an output signal which is shown as passing through a switch 8 onto a final output lead 9. The switch is actuated by a relay 10 which in turn receives its actuating current from a fault detection circuit 11 of conventional design as illustrated, for example in the operating manual for the type of horizon sensor described which is published by Barnes Engineering Company, Stamford, Connecticut, a copy of which manual has been deposited in the Patent Office. Essentially this fault detection circuit operates the relay either if the amplifier output signal is less than a predetermined minimum or is greater than a predetermined maximum. In the first case the switch is opened when the horizon is lost, that is to say there is no earth signal. The second situation is presented when a horizon sensor sees the sun which produces an output signal enormously greater than the normal range encountered in the standard operation of the sensor.

Figure 3:
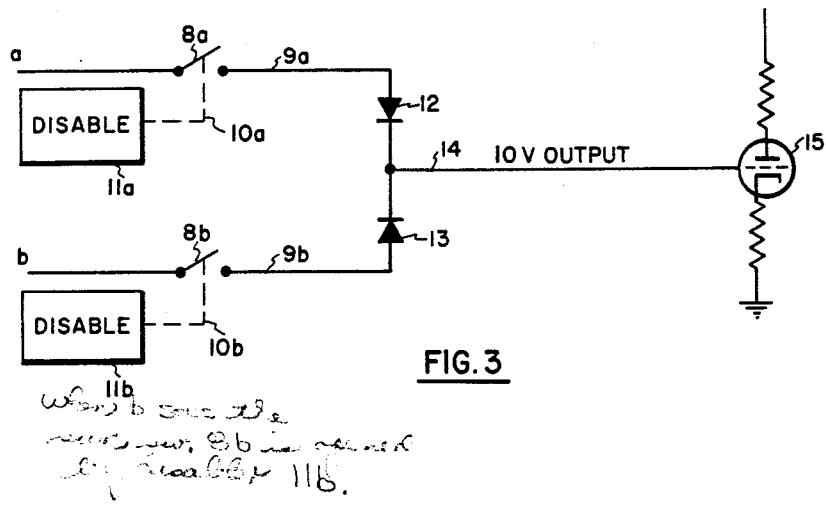
FIG. 3 is a simplified schematic of the combining circuit of the present invention.

FIG. 3 shows the connection of one form of circuit of the present invention with the outputs of two horizon sensors a and b. The parts which are shown in FIG. 2 carry the same reference numerals using the letter to designate the particular horizon sensor. The output signals of the horizon sensors which are preferably of uniform polarity are applied to two diodes 12 and 13 connected back to back. At their connection the final output signal enters the output lead 14 and is introduced into a relatively high impedance input to conventional attitude correcting circuits. This input is symbolically shown in FIG. 3 as a vacuum tube 15. All that is necessary is that the input impedance be much larger than the output impedance of the processing circuits of the two horizon sensors. In a typical case these impedances are of the order of a thousand ohms or less so that they are so small compared to the high impedance of the input to the correcting circuits that it makes no difference whether the output impedance is halved or not.

In operation let it be assumed that each horizon sensor is putting out a signal which for maximum error would be 10 volts D.C. If the attitude of the vehicle is as predetermined each horizon sensor will produce a zero output. But let us assume a departure in pitch from the desired attitude. Both horizon sensors will produce a D.C. output. Let us assume 5 volts. The same output passing through each diode 12 and 13 is applied through the lead 14 to the input of the vacuum tube 15. If the output impedances of the two horizon systems are 1,000 ohms each the net impedance which the tube 15 sees is 500 ohms.

Let us assume that horizon sensor b sees the sun. Its fault detection circuit 11b then actuates the relay 10b and the switch 8b is opened. Horizon sensor a still puts out the same error voltage and this is introduced into the input of the tube 15. Because the input impedance of the latter is much higher than 1,000 ohms the change in impedance which it sees, which has risen from 500 ohms to 1,000 ohms, makes no significant difference in its operation. The correcting mechanism corrects the attitude of the vehicle until there is no error signal put out by horizon sensor a. This may well result in horizon sensor b no longer seeing the sun. In other words the correcting mechanism will receive the same signals regardless of whether one horizon sensor has been disabled or whether both are operating and it is impossible for both horizon sensors to see the sun at the same time. Therefore, there will never be an interruption of horizon sensor output signals when one sensor sees the sun.

Any failure in either sensor which causes it to cease putting out a signal or causes it to put out a much lower error signal has no effect on the correcting mechanism because it always receives the larger error signal put out by either horizon sensor. Redundancy is obtained with its great increase in reliability with the addition of only two diodes which are very reliable elements. It may be argued that it is theoretically possible for the output circuits of a horizon sensor to malfunction and put out a spurious and unusually high error signal. This is the only situation where the present invention does not provide complete redundancy protection. As a practical matter this is of little significance. Almost anything which can wear out or go wrong in a horizon sensor will cause it to fail to produce an output signal, or to produce a much weaker one. Failure of most components results in no output signal, for example, a bearing seizes, the motor burns out or a connection breaks. Other things such as a transistor in the sensor circuits if it deteriorates almost invariably loses sensitivity. Thus almost any kind of malfunctioning of a horizon sensor will result in a lower output. In such a case the complete redundancy protection of the present invention is obtained. The vehicle is steadied as effectively if one horizon sensor is disabled as if both were operating.

Figure 4:
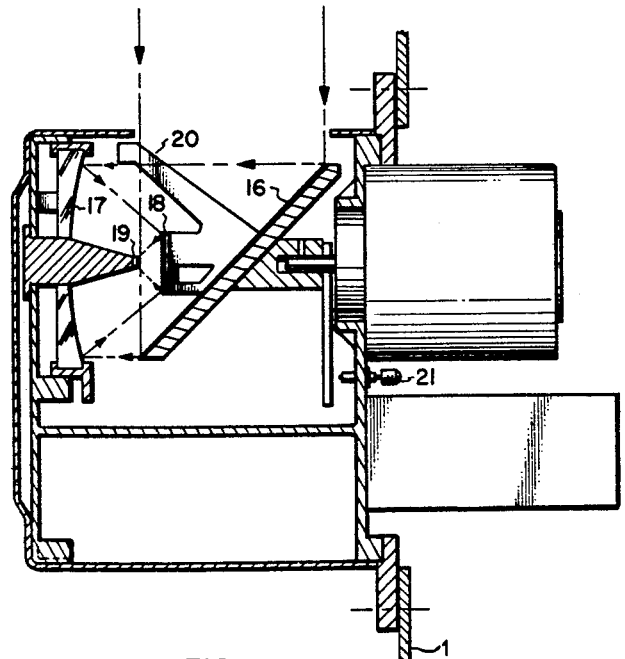
FIG. 4 is a section through a catoptric horizon sensor which is useful where unusual space requirements obtain.

In certain cases it may be undesirable to locate roll sensors in the ends of a vehicle. In such cases it may be necessary to mount the sensor in the side of the vehicle and in such cases extreme dimensional limitations may be required. Such a sensor is shown in FIG. 4. The wall of the vehicle is again designated as 1 and the sensor is provided with a rotating scanning mirror 16 which scans, conically reflecting a beam onto a Cassegrain primary mirror 17. When extreme optical speed and compactness is desired the Cassegrain secondary mirror 18 cannot be mounted on the primary mirror or its supports as is usual although the detector 19 can. In such a case the secondary mirror 18, which is preferably plane, may be supported by a thin arm 20 and rotates about the axis of rotation of the mirror. The thin plate 20 results in a minimum of obscuration of the incoming radiation which is shown by the arrows. It also serves as a counterbalance to the scanning mirror.

If the sensor is a roll sensor the scan will intercept the vehicle body through a portion of its scan. The simple addition of two more magnetic inserts in the reference pickup shown at 21 serves to blank out response during the portion of the scan when it intersects the vehicle itself.

We claim:
1. A horizon sensor for space vehicle use comprising in combination,
 (a) at least two horizon sensors scanning with respect to a single vehicle attitude axis, said horizon sensors including electronic processing circuits producing an output signal when the vehicle is not in a predetermined attitude,
 (b) a correcting circuit input of relatively high impedance as compared to the output impedances of the horizon sensor processing circuits,
 (c) electronic circuits comprising a plurality of inputs and a single output, said output responding to electronic signals in the input having maximum signal and means for connecting the output of the horizon sensors to the inputs of the circuitry and the output of the circuitry to the correcting circuit input.

2. A horizon sensor system according to claim 1 in which the number of horizon sensors is two and the circuitry is a pair of diodes connected back to back with input to each of the diodes and output from their junction.

3. A horizon sensor according to claim 1 provided with a disabling circuit which temporarily disables the sensor output when the sensor sees the sun.

4. A horizon sensor according to claim 1 provided with a disabling circuit which temporarily disables the sensor output when the sensor fails to scan across the horizon.

5. Horizon sensors according to claim 1 in which the sensors are of the conical scan type.

6. Horizon sensors according to claim 2 in which the sensors are of the conical scan type.

References Cited in the file of this patent

UNITED STATES PATENTS 3,020,406     Whitney ---------------- Feb. 6, 1962